April 7, 1970 L. O. HEFLINGER ET AL 3,504,957
OPTICAL STABILIZED TELESCOPE ARRANGEMENT
Filed Aug. 8, 1967 2 Sheets-Sheet 1
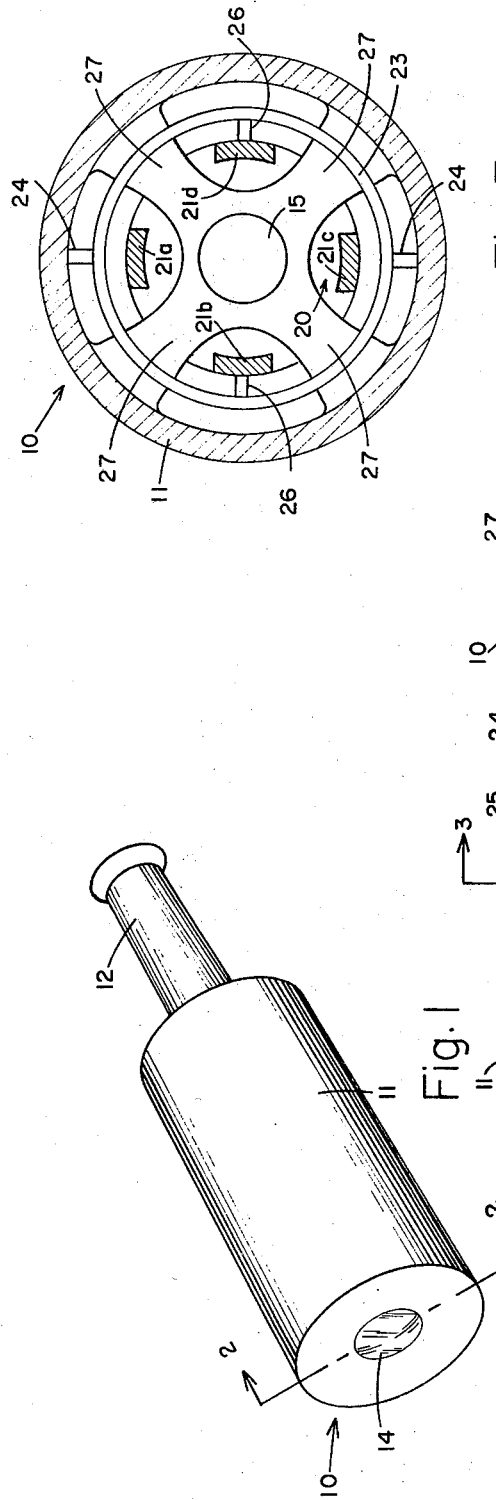
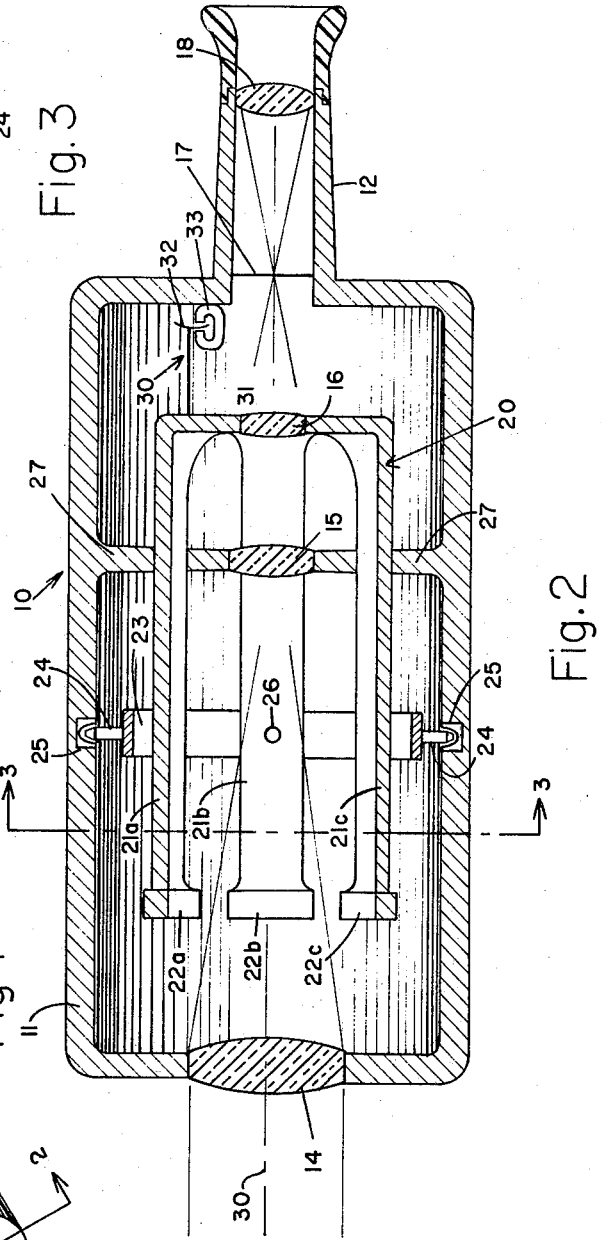
Lee O. Heflinger
Robert E. Brooks
INVENTORS
BY *Edward Dugas*
AGENT Lee O. Heflinger
Robert E. Brooks
INVENTORS BY Edward Dugas
AGENT United States Patent Office 3,504,957
Patented Apr. 7, 1970

3,504,957
OPTICAL STABILIZED TELESCOPE ARRANGEMENT
Lee O. Heflinger, Torrance, and Robert E. Brooks, Redondo Beach, Calif., assignors to TRW Inc., Redondo Beach, Calif., a corporation of Ohio
Filed Aug. 8, 1967, Ser. No. 659,107
Int. Cl. G02b 23/00
U.S. Cl. 350—16       9 Claims

ABSTRACT OF THE DISCLOSURE

An apparatus for stabilizing the image of an optical system. The optical system is an in-line telescope having an objective lens, reticle and an eyepiece. Interposed between the objective lens and the reticle is an erector lens which is pivoted with at least one degree of freedom about a pivot point that lies between the erector lens and the objective lens. The erector lens is stabilized about the pivot point so as to effectively stabilize the image at the reticle.

BACKGROUND OF THE INVENTION

This invention provides an apparatus for stabilizing the image of a wide variety of optical systems wherein unwanted systems vibration or motion occurs, such as vibration from the normal hand tremor of the person holding the telescope or binoculars, or the vibration transmitted from vehicles such as aircraft, ships and the like, to the gunsights and other optical systems mounted thereon. In unstabilized optical systems, such vibration causes the image viewed or photographed to blur. The human eye, for example, can follow vibrations of an image only to about one cycle per second, assuming that the amplitude of the vibration is small. Because the higher optical system magnifications magnify the apparent degrees of travel of the apparent image, the magnification of many optical systems is limited strictly by the increase in blurring and image motion stabilization properties which attend the magnifications. The prior art contains a number of ideas for image stabilization, such as rigidly mounting the entire optical system frame to a tripod or to stabilization gyros or correcting by electronic image shifting, using either optical feedback or inertial sensing to provide corrective signals. In the television industry, the "Dynalens" has been used. The Dynalens, however, requires two gyros and two servos, one set to move each transparent end plate in order to vary the geometry of a liquid prism.

In U.S. patent application Ser. No. 615,626, now Patent No. 3,460,881 entitled "Image Stabilizer" by Lee O. Heflinger (one of the inventors of the present invention), which was filed Feb. 13, 1967, describes an apparatus for improving the operation of the prior art. The improvement consists of placing the inertially stabilized mirror with its reflective surfaces perpendicular to the viewing axis of the optical system but not coincident with the viewing axis. An optical element is placed along the viewing axis, one-half the focal length from a stabilized reflector, for converging and reflecting the incoming light rays at an angle onto the reflecting surface of the stabilized reflector, and means are provided for viewing the converging light rays that are deflected from the reflector. Both of these systems are of the folded optical type, which are generally considered to be complex when compared to an in-line optical system. It is therefore highly desirable to have an in-line optical system in which the feature of optical stabilization is also present.

SUMMARY OF THE INVENTION

The present invention relates to optical systems and, more particularly, to an apparatus for stabilizing the image of an optical system. The desirability of having an in-line telescope with image stabilization has fostered the device of the present invention.

Accordingly, it is a primary object of the present invention to provide a new and novel optical stabilized telescope arrangement.

It is a further object of the present invention to provide an optical system wherein the effects of certain vibrations are substantially reduced or eliminated.

It is a further object of the present invention to provide an in-line telescope arrangement wherein the optical image is stabilized by means of an inertially stabilized erector lens.

In a preferred form of the present invention, the foregoing objects are achieved by placing an erector lens between a reticle and an objective lens of focal length $f$, with a field lens positioned between the objective and erector lens. The field lens is positioned at the focal point of the objective lens. The erector lens is positioned at a distance $L_1$ from the field lens and a distance $L_2$ from the reticle. The erector lens is then pivoted for movement about a pivot point P located a distance $$f \frac{L_2}{L_1+L_2}$$

ahead of the erector lens towards the objective lens. Stabilization may be by means of a gyroscope, inertia device or other such means, and the image may be stabilized with respect to the housing or case holding the objective lens with respect to inertial space.

The aforementioned and other objects of the present invention will become more apparent when taken in conjunction with the following description and drawings in which like numbers designate like parts.

BRIEF DESCRIPTION OF THE DRAWINGS

FIGURE 1 is a perspective view of the optical system of the present invention;

FIGURE 2 is a sectional view taken along the sectioning lines 2—2 of the system shown in FIGURE 1;

FIGURE 3 is another sectional view taken along the sectioning lines of the system shown in FIGURE 2;

DESCRIPTION OF THE PREFERRED EMBODIMENT

Figure 4:
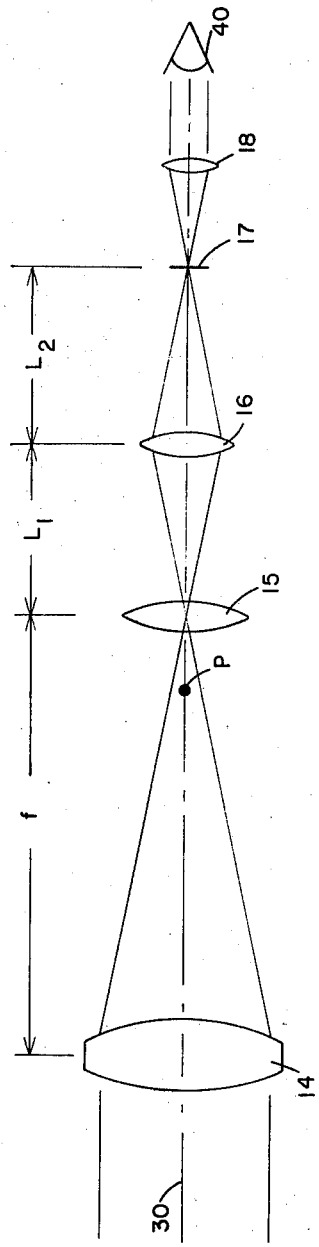
FIGURE 4 is a schematic diagram illustrating the optical system.

Referring now to FIGURES 1, 2 and 3, the optical system 10 is shown as an in-line telescope having a hollow cylindrical housing 11, one end of which supports an objective lens 14 and the other end of which supports a smaller diameter cylindrical member 12 and which is mounted a reticle 17 and an eyepiece 18. Supporting fingers 27 project radially inwardly from the cylindrical housing 11 to provide a support for the field lens 15 which is positioned at the focal point of the objective lens 14. A ring type gimbal 23 is supported by shafts 24 and bearings 25 for freedom of rotation with respect to the cylindrical housing 11, about an axis defined by the axis of the shafts 24. A supporting frame 20 having four finger-like projections 21a, 21b, 21c and 21d, is supported from gimbal member 23 by shafts 26 for rotation about an axis defined by the shafts 26, which are orthogonal to the shafts 24. The supporting member 20 is therefore provided with two degrees of rotation with respect to the cylindrical housing 11. An erector lens 16 is fixedly mounted to the support frame member 20 between the field lens 15 and the eyepiece lens 18. Masses 22a, 22b, 22c and 22d are attached to the ends of arms 21a, 21b, 21c and 21d, respectively, to statically balance the frame member 20 about the axis defined by shafts 26 and 24. The resultant mass inertia of frame member 20 provides a stabilizing effect to the erector lens 16 with respect to the cylindrical body 11. Alternatively, although not shown, a small motor and flywheel (gyro) attached to the frame member 20 can be used to provide the necessary stabilization for the erector lens. The specific technique of the stabilization of the erector lens is not essential to this invention. It is only necessary to isolate the erector lens from high-frequency angular motions so that angular deflections and rates of the erector lens are a fraction of the angular deflection of the cylindrical housing 11.

Referring now to FIGURE 4 wherein is schematically illustrated the positioning of the lenses of the optical system 10 and its viewing axis 30. The field lens 15 is shown located a distance $f$ equal to the focal length of the objective lens 14. The erector lens 16 is shown located a distance $L_1$ from the field lens 15, and a distance $L_2$ from the reticle 17, onto which the image is formed and viewed by the observer's eye 40 through the eyepiece lens 18. The reticle is not necessary to the invention and may be eliminated. The eyepiece focal plane can serve the same purpose. The pivot point of the erector lens 16 is shown as the point P located on the viewing axis 30. The erector lens is now free to rotate about the pivot point P which is located a distance equal to $$f\frac{L_2}{L_1+L_2}$$

ahead of the erector lens. Thus, the erector lens is able to move transverse to the telescope 30.

Figure 5:
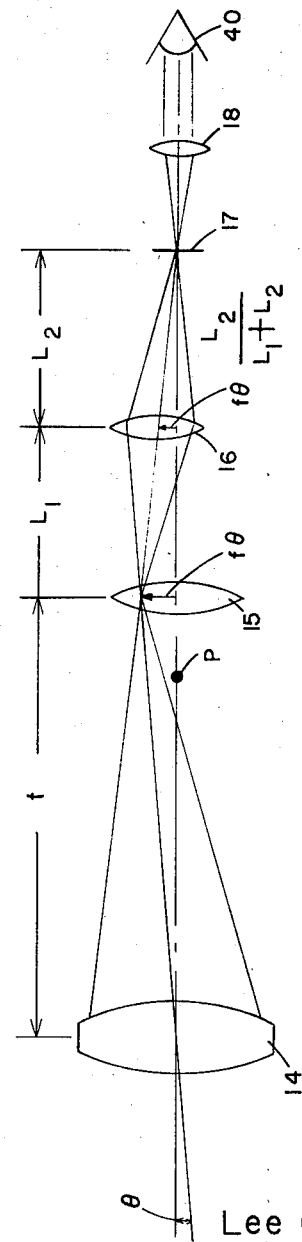
FIGURE 5 is a schematic diagram illustrating the operation of the optical system.

Referring now to FIGURE 5, for the operation of the device. Note first that as with a conventional telescope, translations of the instrument do not cause a shift of the image on the reticle. Thus, we need only consider rotational disturbances and shall show how the new arrangement keeps the image stationary on the reticle for these motions also. To describe the operation of the system, it is most convenient to adapt the cylindrical housing 11 of the instrument as the reference frame. From this reference frame, the object will appear to move counter-clockwise by an angle $\theta$ when the housing 11 is given a clockwise disturbance. The angle $\theta$, rotating counterclockwise, will move the image upwards a distance $f\theta$ on the field lens 15. The erector lens 16 will also move upwards a distance $$\theta f\frac{L_2}{L_1+L_2}$$

Since the conjugate image points of the erector lens are at distance $L_1$ and $L_2$, the translated image at the objective focal point, the center of the erector lens and the original focal point on the output side of the objective lens are all colinear. Thus, the image formed by the moved system is at exactly the same point of the reticle 17 as before the motion. The image has therefore been stabilized. If desired, the distance from the pivot point P to the erector can be made other than $$f\frac{L_2}{L_1+L_2}$$

in order to deliberately leave some motion in the system. This is desirable if one wishes to stabilize the output image of the telescope relative to inertial space rather than relative to the instrument housing or frame.

The field lens 15, which is optional, is located at or near the objective's focus and bends the cone of rays of the image so that the cone passes through the erector lens in the conventional manner of the field lens. Because the erector lens can be mounted in the fashion shown, a large moment of inertia can be provided for a given amount of mass. The apparatus may also incorporate a dampening system 30 (referring back to FIGURE 2), which is comprised of a dampening magnet 33, an aluminum disc 32 mounted by means of a flexible wire 31 such as a piano wire, so as to isolate the dampening disc 32 from the erector lens 16 for high frequencies. This arrangement provides adequate dampening to the system, yet does not convey high frequencies to the erector lens.

While the passive stabilization system described herein appears to be the most desirable, it is also possible as previously mentioned to use a gyro to stabilize the elements holding the erector lens. The configuration described also lends itself to a binocular type instrument. A binocular instrument can be constructed by attaching two optical systems 10 together and linking together with a pair of rods and flexure attachments, the frame elements 20 so that they rotate as a single unit. The frames 20 may then be stabilized either with their intrinsic inertia or with a gyroscope.

While there has been shown what is considered to be the preferred embodiment of the invention, it will be manifest that many changes and modifications may be made therein without departing from the essential spirit of the invention. It is intended, therefore, in the annexed claims to cover all such changes and modifications as may fall within the true scope of the invention.

What is claimed is:

1. An optical telescope having means for stabilizing the image developed thereby, said telescope comprising:
   (a) a telescope housing defining a major optical axis;
   (b) an objective lens positioned at one end of said telescope housing and along said optical axis, said objective lens having an objective focal plane spaced a focal distance $f$ from said objective lens;
   (c) an erector lens positioned along said optical axis and spaced from said objective focal plane, said erector lens having an erector focal plane, the distance between said erector lens and said erector focal plane being $L_2$, and the distance between said objective focal plane and said erector lens being $L_1$, said erector lens having a pivot point disposed substantially at a distance from said erector lens;

$$f\frac{L_2}{L_1+L_2}$$

(d) means connected between said telescope housing and said erector lens for supporting and stabilizing said erector lens about said pivot point, whereby variations in the inclination of said telescope housing are compensated to maintain the optical image from said objective lens substantially stabilized at said erector focal plane; and
   (e) an eye lens positioned at the opposite end of said telescope housing from said objective lens for viewing the image created at said erector focal plane.

2. A telescope as defined in claim 1 wherein a field lens is disposed along said major optical axis and substantially within said objective focal plane, said field lens being fixed to said telescope housing.

3. A telescope as defined in claim 1 wherein damping means is connected between said erector lens and said telescope housing for isolating relatively high frequency movements of said telescope housing from said erector lens.

4. A telescope as defined in claim 1 wherein said means for stabilizing said erector lens includes a support frame for said erector lens pivotally mounted to said telescope housing, said frame being statically balanced about said pivot point.

5. A telescope as defined in claim 4 wherein said supporting frame is gimballed to said telescope housing, thereby to provide said erector lens with two degrees of angular freedom.

6. An optical telescope having means for stabilizing the image developed thereby against undesired motions, said telescope comprising:
(a) a telescope housing defining a major optical axis;
(b) an objective lens positioned at one end of said telescope housing along said optical axis, said objective lens having an objective focal plane positioned at a focal length $f$ from said objective lens;
(c) an erector lens positioned along said major optical axis and adjacent the other end of said telescope housing, said erector lens having an erector focal plane;
(d) a supporting frame for pivotally mounting said erector lens to said telescope housing between said objective lens and said objective focal plane at a first point, the distance between said erector lens and said erector focal plane being $L_2$, the distance between said erector lens and said objective focal plane being $L_1$, said pivot point having a distance from said erector lens of substantially $$f \frac{L_2}{L_1+L_2}$$

said supporting frame having a movement of inertia substantially greater than that of said erector lens, thereby to effectively isolate small motions of said telescope housing with respect to said erector lens to keep the optical image created by said objective lens stabilized at said erector focal plane; and
(e) an eye lens positioned at the opposite end of said telescope housing from said objective lens for viewing the image created at said erector focal plane.

7. A telescope as defined in claim 6 wherein damping means is connected between said supporting frame and said telescope housing for isolating relatively higher frequency movements of said telescope housing from said erector lens.

8. A telescope as defined in claim 6 wherein a field lens is disposed along said optical axis and substantially at said objective focal plane.

9. A telescope as defined in claim 6 wherein said supporting frame is pivotally mounted to said telescope housing with two degrees of rotational freedom.

References Cited
UNITED STATES PATENTS

| | | | |
|---|---|---|---|
| 2,341,495 | 2/1944 | Wittel | 350—54 |
| 2,959,088 | 11/1960 | Rantsch | 356—250 |
| 3,378,326 | 4/1968 | Alvarez | 350—16 |

DAVID SCHONBERG, Primary Examiner

R. L. SHERMAN, Assistant Examiner